United States Patent
Sun et al.

(10) Patent No.: US 12,041,602 B1
(45) Date of Patent: Jul. 16, 2024

(54) 5G-TSN RESOURCE JOINT SCHEDULING APPARATUS AND METHOD BASED ON DDPG

(71) Applicant: University of Science and Technology Beijing, Beijing (CN)

(72) Inventors: Lei Sun, Beijing (CN); Yuan Zhu, Beijing (CN); Jianquan Wang, Beijing (CN); Wei Li, Beijing (CN); Sha Li, Beijing (CN); Yang Zhang, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 0 days.

(21) Appl. No.: 18/395,771

(22) Filed: Dec. 26, 2023

(30) Foreign Application Priority Data

Jan. 20, 2023 (CN) .......................... 202310058426.1

(51) Int. Cl.
*H04W 72/1263* (2023.01)
*H04W 72/0446* (2023.01)
*H04W 72/542* (2023.01)
*H04W 72/543* (2023.01)

(52) U.S. Cl.
CPC ... *H04W 72/1263* (2013.01); *H04W 72/0446* (2013.01); *H04W 72/542* (2023.01); *H04W 72/543* (2023.01)

(58) Field of Classification Search
None
See application file for complete search history.

(56) References Cited

U.S. PATENT DOCUMENTS

| | | | |
|---|---|---|---|
| 2021/0243641 A1* | 8/2021 | Gangakhedkar | H04L 12/1407 |
| 2022/0046462 A1* | 2/2022 | De Andrade Jardim | H04L 47/283 |
| 2022/0061063 A1* | 2/2022 | Patel | H04W 72/1263 |
| 2022/0104062 A1* | 3/2022 | Aijaz | H04W 28/0268 |

(Continued)

OTHER PUBLICATIONS

Gu et al., "Knowledge-Assisted Deep Reinforcement Learning in 5G Scheduler Design: From Theoretical Framework to Implementation", Jul. 1, 2021, IEEE Journal on Selected Areas in Communication, vol. 39, No. 7, pp. 2014-2028 (Year: 2021).*

*Primary Examiner* — Clemence S Han
(74) *Attorney, Agent, or Firm* — True Shepherd LLC; Andrew C. Cheng (57) ABSTRACT

A 5G-TSN resource joint scheduling apparatus includes: a state information acquisition module, a scheduling decision making module, and a configuration module. The state information acquisition module is configured to acquire bottom-layer network information, and process the acquired bottom-layer network information to obtain state information, the bottom-layer network information includes channel information, gate control list information of a TSN domain, and queue information in a base station. The scheduling decision making module is configured to obtain a result of decision making based on the state information output by the state information acquisition module using a DDPG-based reinforcement learning model, the result of decision making includes whether to allocate resources for a current queue and a number of resources actually allocated to the current queue. The configuration module is configured to convert the result of decision making to one or more instructions understandable by the base station to configure the base station.

6 Claims, 8 Drawing Sheets

(56) References Cited

U.S. PATENT DOCUMENTS

| | | |
|---|---|---|
| 2023/0156559 A1* | 5/2023 | Aijaz ................. H04L 47/24 |
| 2023/0156769 A1 | 5/2023 | Eisen et al. |
| 2023/0171014 A1* | 6/2023 | Patel ................. H04W 72/23 |
| | | 370/503 |
| 2023/0276483 A1 | 8/2023 | Xu et al. |
| 2023/0354334 A1 | 11/2023 | Chen et al. |

* cited by examiner

5G-TSN RESOURCE JOINT SCHEDULING APPARATUS AND METHOD BASED ON DDPG

CROSS-REFERENCE TO RELATED APPLICATIONS

This application claims priority to Chinese Patent Application No. 202310058426.1 with a filing date of Jan. 20, 2023. The content of the aforementioned application, including any intervening amendments thereto, is incorporated herein by reference.

TECHNICAL FIELD

The present disclosure relates to the technical field of communications, and in particular, relates to a $5^{th}$ generation (5G) time-sensitive networking (TSN) joint scheduling apparatus and method based on deep deterministic policy gradient (DDPG).

BACKGROUND

TSN is a set of IEEE 802 standards under development of the Time-Sensitive Networking task group of the IEEE 802.1 working group. In the field of industrial Internet application, due to low delay requirements and high reliability requirements of network transmission in industrial sites, time-sensitive networks become one of the hot research optics in this field. Time-sensitive networking has definite delays and multi-service bearing capacities, can be used for industrial communications with real-time determinism, certain range, low-delay industrial communication, has the function of time synchronization, delay assurance to ensure timeliness, and also has the function of low jitter and very low packet loss rate, such that Ethernet can be suitable for high reliability and low delay requirements of time-sensitive application scenarios.

Figure 1:
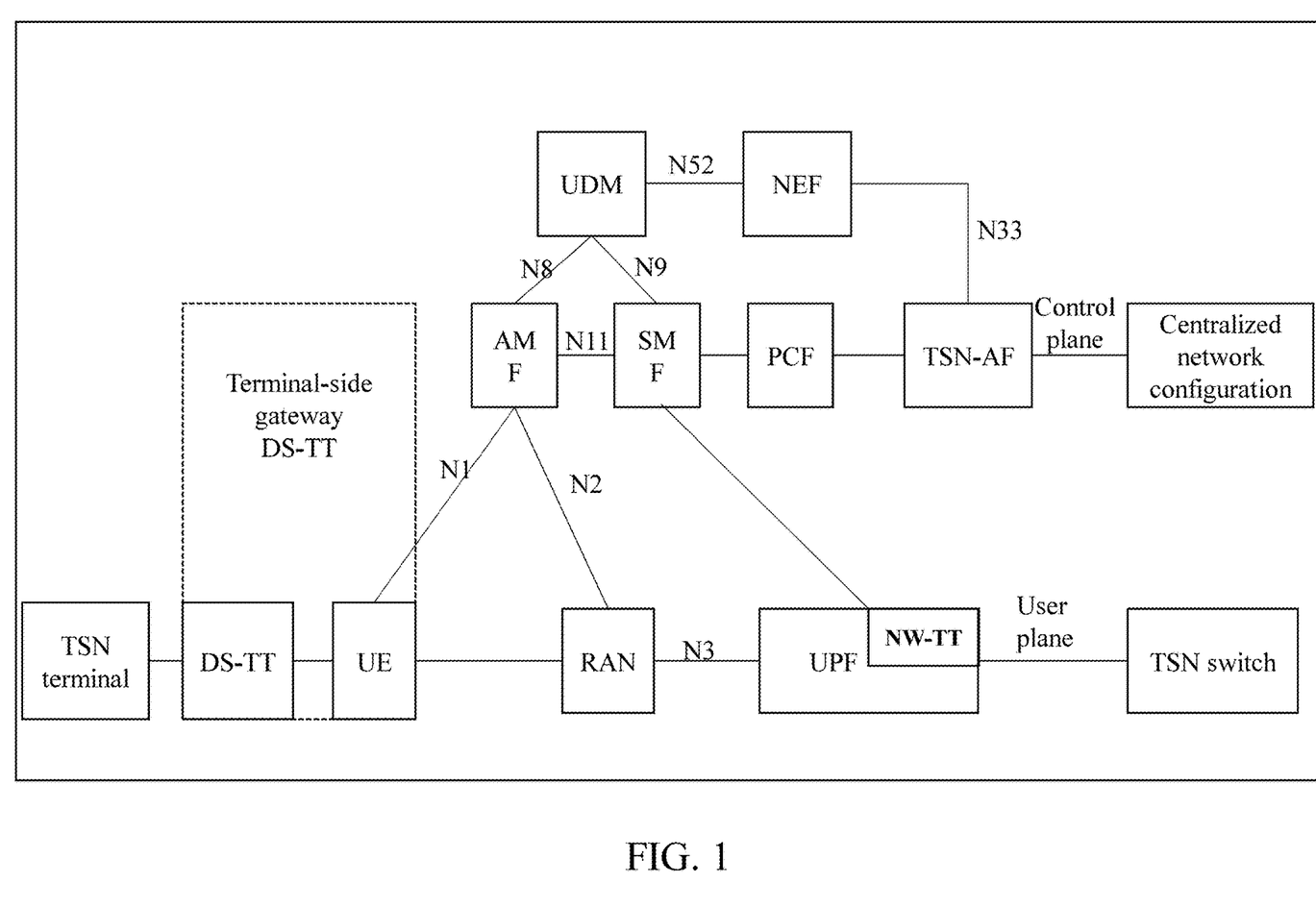
FIG. 1 is a schematic diagram of a 5G TSN network architecture defined by 3GPP.

5G R16 defines a 5G-TSN cooperative architecture, wherein the entire 5G network includes a terminal, a radio network, a bearer network and a core network, and acts as a transparent bridge in the TSN network. FIG. 1 shows a 5G-TSN network architecture model defined by the 3GPP standard.

To adapt to the TSN network, 5G system (5GS) adds the network element function is added to the 5GS. A TSN application function entity (TSN-AF) is newly added to the control plane, such that the 5GS and the TSN network can perform information interaction, and at the same time, the TSN-AF interacts with entities such as a policy control function (PCF) and a session management function (SMF) in the 5G core network, so as to realize the correction and transmission of key parameters of a TSN service flow under a 5G clock, and realize quality of service (QOS) assurance. A TSN converter is newly added as a gateway in the user plane, including a device side TSN translator (DS-TT) and a network side TSN translator (NW-TT). They also support IEEE802. 1AS, 802. 1AB and other protocols, which can reduce the excessive impacts of TSN protocol translation on the 5G new air interface. Through these two gateways, 5G network related information may be transmitted to the TSN network via the DS-TT and the NW-TT that provide TSN ingress and egress ports, and 5G QoS configuration information about the need for QOS service provisioning is also transmitted to the 5G bridge via these two gateways. After the transmission data reaches the queue at the gateway, the transmission of the cached data in the queue is performed according to a periodic gate control list (GCL) set at the gateway.

Further, the 5G system performs function enhancement on the original core network element, and enhances the PCF policy control function to realize policy decision making and issuing/notifying on the TSN service; network elements such as an enhanced access and mobility management function (AMF), an SMF, a unified data management (UDM) function, and a UPF realize the management of a PDU session of a TSN service, and the intercommunication of TSN parameters and policies with a DS-TT; and the enhanced UPF realizes the TSN clock synchronization between the NW-TT and the TSN service network, such that the 5G network and the TSN network have the functions of cross-domain service parameter interaction (time information, priority information, packet size and interval, flow direction, and the like), port and queue management, QoS mapping, and the like.

At present, the related art mainly has the following problems:

In one aspect, the 5G-TSN architecture proposed by 3GPP only defines functional entities and network architecture. In practice, however, 5G-TSN may carry the transmission of multiple services, in addition to time-sensitive services, also 5G services, such as video streams. When these services arrive at the base station at the same time, how to schedule the services remains to be solved. In another aspect, in the 5G-TSN architecture, the scheduling of air interface resources not only needs to consider the radio channel state and base station queue, but also considers the gate control of the NW-TT and the DS-TT. Combined with the gating configuration, it is a better strategy to allocate air interface resources. This is because when the gate control of the NW-DS-TT is off, even if the base station schedules the time sensitive traffic, the traffic will wait at the DS-TT.

SUMMARY

The present disclosure provides a 5G TSN joint scheduling apparatus and method based on DDPG, to solve the problem of resource scheduling for cross-network transmission of multiple services over 5G-TSN collaborative transmission architecture.

To solve the above technical problem, the present disclosure provides the following technical solutions.

In one aspect, the present disclosure provides a 5G-TSN resource joint scheduling apparatus based on DDPG, applicable to a network device of 5G-TSN. The apparatus includes: a state information acquisition module, a scheduling decision making module, and a configuration module. The state information acquisition module and the configuration module are both connected to the scheduling decision making module.

The state information acquisition module is configured to acquire bottom-layer network information, process the acquired bottom-layer network information to obtain state information, and transmit the obtained state information to the scheduling decision making module, wherein the bottom-layer network information comprises channel information, gate control list information of a TSN domain, and queue information in a base station.

The scheduling decision making module is configured to obtain a result of decision making based on the state information output by the state information acquisition module using a DDPG-based reinforcement learning model, and transmit the result of decision making to the configuration module, wherein the result of decision making comprises whether to allocate resources for a current queue and a number of resources actually allocated to the current queue.

The configuration module is configured to convert the result of decision making to one or more instructions understandable by the base station to configure the base station.

Further, the state information acquisition module is specifically configured to:
acquire the bottom-layer network information, comprising: a gate control state $I_{GCL}^{TS} \in \{0,1\}$ of DS-TT, a length l of each queue in the base station, a waiting delay d of a queue head, and a channel quality g of a 5G system;
process the acquired bottom-layer network information to obtain the state information, including:
mapping, based on the channel quality, a number of bits that one resource block is capable of bearing;

$$m_i = Z(g_i)$$

wherein $g_i$ represents a channel quality of receiving a current queue i, $m_i$ represents the number of bits that one resource block is capable of bearing, and Z represents a mapping function;
calculating, based on the channel information and the queue information, a number of resources desired by each queue;

$$r_i^{expt} = \frac{s_i \times l_i}{m_i}$$

wherein $s_i$ represents a data packet size of a queue i, $l_i$ represents a length of the queue i, and $r_i^{expt}$ represents a number of resources desired by the queue i; and
setting a stop time for each service, and normalizing the waiting delay based on the stop time;

$$d_i^{nor} = \frac{d_i^h}{d_i}$$

wherein $d_i^{nor}$ represents a normalized waiting delay, $d_i^h$ represents the stop time of the service, and $d_i$ represents a waiting time of a service in the queue in the base station; and
transmit the obtained state information to the scheduling decision making module, wherein the state information comprises the number of resources desired by each queue, the length of each queue, the normalized waiting delay, and the gate control state.

Further, the number of resources that are actually allocated to the queue i is obtained by the following equation:

$$r_i^{act} = \left\lceil \frac{a_i \cdot r_i^{expt}}{\sum_{i=1}^{N} a_i \cdot r_i^{expt}} * \Omega \right\rceil$$

wherein $r_i^{act}$ represents the number of resources that are actually allocated to the queue i, $\Omega$ represents a total number of resources, $a_i$ represents whether resources are allocated to the queue i, and N represents a number of queues to be scheduled in the base station.

Further, when the data is a video stream, for a time-sensitive stream, the reinforcement learning model uses a reward function $r_v$ as follows:

$$r_v = \begin{cases} \dfrac{1}{d_i - d_i^h + \Delta} & c \geq c^{min}, \\ 0 & c < c^{min} \end{cases}$$

for a time-sensitive stream, the reinforcement learning model uses a reward function $r_t$ as follows:

$$r_t = \psi(r_v) = \begin{cases} (1+\lambda_1)*r, & I_{GCL}^{TS} = 1 \\ (1-\lambda_2)*r, & I_{GCL}^{TS} = 0 \end{cases}$$

$$r = \frac{1}{d_i - d_i^h + \Delta}$$

wherein $d_i^h$ represents the stop time of the service, $d_i$ represents the waiting time of the service in the queue in the base station, $\Delta$ represents a predetermined positive number, c represents an average throughput of a current video stream, $c^{min}$ represents a minimum average throughput desired by a video streaming service, $\lambda_1$ and $\lambda_2$ represent two parameters respectively for adjusting and controlling service reward values for different waiting times when the gate control is enabled or disabled, and $\psi$ represents a potential function.

In another aspect, the present disclosure provides a 5G-TSN resource joint scheduling method based on DDPG, applicable to a 5G-TSN network device. The method includes:
acquiring bottom-layer network information, and processing the acquired bottom-layer network information to obtain state information, wherein the bottom-layer network information comprises channel information, gate control list information of a TSN domain, and queue information in a base station;
obtaining a result of decision making based on the state information using a DDPG-based reinforcement learning model, wherein the result of decision making comprises whether to allocate resources for a current queue and a number of resources actually allocated to the current queue; and
converting the result of decision making to one or more instructions understandable by the base station to configure the base station.

Further, acquiring the bottom-layer network information, and processing the acquired bottom-layer network information to obtain the state information include:
acquiring the bottom-layer network information, comprising: a gate control state $I_{GCL}^{TS} \in \{0, 1\}$ of DS-TT, a length l of each queue in the base station, a waiting delay d of a queue head, and a channel quality g of a 5G system;
processing the acquired bottom-layer network information to obtain the state information, comprising:
mapping, based on the channel quality, a number of bits that one resource block is capable of bearing;

$$m_i = Z(g_i)$$

wherein $g_i$ represents a channel quality of receiving a current queue i, $m_i$ represents the number of bits that one resource block is capable of bearing, and Z represents a mapping function;

calculating, based on the channel information and the queue information, a number of resources desired by each queue;

$$r_i^{expt} = \frac{s_i \times l_i}{m_i}$$

wherein $s_i$ represents a data packet size of a queue i, $l_i$ represents a length of the queue i, and $r_i^{expt}$ represents a number of resources desired by the queue i; and setting a stop time for each service, and normalizing the waiting delay based on the stop time;

$$d_i^{nor} = \frac{d_i^h}{d_i}$$

wherein $d_i^{nor}$ represents a normalized waiting delay, $d_i^h$ represents the stop time of the service, and $d_i$ represents a waiting time of a service in the queue in the base station; and finally obtaining the state information to the scheduling decision making module, wherein the state information comprises the number of resources desired by each queue, the length of each queue, the normalized waiting delay, and the gate control state.

Further, the number of resources that are actually allocated to the queue i is obtained by the following equation:

$$r_i^{act} = \left\lceil \frac{a_i \cdot r_i^{expt}}{\sum_{i=1}^{N} a_i \cdot r_i^{expt}} * \Omega \right\rceil$$

wherein $r_i^{act}$ represents the number of resources that are actually allocated to the queue i, $\Omega$ represents a total number of resources, $a_i$ represents whether resources are allocated to the queue i, and N represents a number of queues to be scheduled in the base station.

Further, when the data is a video stream, for a time-sensitive stream, the reinforcement learning model uses a reward function $r_v$ as follows:

$$r_v = \begin{cases} \dfrac{1}{d_i - d_i^h + \Delta} & c \geq c^{min}, \\ 0 & c < c^{min} \end{cases}$$

for a time-sensitive stream, the reinforcement learning model uses a reward function $r_t$ as follows:

$$r_t = \psi(r_v) = \begin{cases} (1 + \lambda_1) * r, & I_{GCL}^{TS} = 1 \\ (1 - \lambda_2) * r, & I_{GCL}^{TS} = 0 \end{cases}$$

$$r = \frac{1}{d_i - d_i^h + \Delta}$$

wherein $d_i^h$ represents the stop time of the service, $d_i$ represents the waiting time of the service in the queue in the base station, $\Delta$ represents a predetermined positive number, c represents an average throughput of a current video stream, $c^{min}$ represents a minimum average throughput desired by a video streaming service, $\lambda_1$ and $\lambda_2$ represent two parameters respectively for adjusting and controlling service reward values for different waiting times when the gate control is enabled or disabled, and $\psi$ represents a potential function.

In still another aspect, the present disclosure further provides an electronic device. The electronic device includes a processor and a memory. The memory stores at least one instruction. The processor, when loading and executing the at least one instruction, is caused to perform the above method.

In yet still another aspect, the present disclosure provides a computer-readable storage medium The computer-readable storage medium stores at least one instruction. The at least one instruction, when loaded and executed by a processor, causes the processor to perform the above method.

The technical solutions according to the present disclosure achieve at least the following beneficial effects:

The present disclosure, with respect to the problem of multiple service scheduling at air interfaces of the base stations, proposes an air interface scheduling policy for multiple services based on reinforcement learning. Accordingly, linkages between the DS-TT gate control state and base station scheduling are implemented, such that delay requirements of time-sensitive services are satisfied, and throughputs of other services are improved to some extent.

BRIEF DESCRIPTION OF THE DRAWINGS

For clearer descriptions of the technical solutions according to the embodiments of the present disclosure, drawings that are to be referred for description of the embodiments are briefly described hereinafter. Apparently, the drawings described hereinafter merely illustrate some embodiments of the present disclosure. Persons of ordinary skill in the art may also derive other drawings based on the drawings described herein without any creative effort.

FIG. 8 is a schematic diagram of a comparison of three algorithms; wherein (a) is a schematic diagram of changes of an average delay of a time-sensitive service as the number of users increases under proportional fair (PF), earliest deadline first (EDF) and DDPG-based algorithms, and (b) is a schematic diagram of changes of a system throughput as the number of users increases under PF, EDF and DDPG-based algorithms.

DETAILED DESCRIPTION

To make the objectives, technical solutions and advantages of the present disclosure clearer, hereinafter the embodiments of the present disclosure are further described in detail with reference to the accompanying drawings.

First Embodiment

During transmission of 5G-TSN data across networks, a port gateway DS-TT is inevitably involved, and the data to be transmitted is temporarily buffered in a port gateway queue. During scheduling, a base station not only needs to consider delay requirements of time-sensitive services, channel transmission quality and the like information, but also needs to avoid affecting a throughput of other service transmission, and still needs to consider a gate control state of a gate control list GCL at the DS-TT. Based on this, this embodiment provides a 5G-TSN joint resource scheduling mechanism based on reinforcement learning DDPG under the condition of considering the DS-TT, and the scheduling mechanism satisfies delay requirements of time-sensitive services while improving throughputs of other services to some extent.

Figure 2:
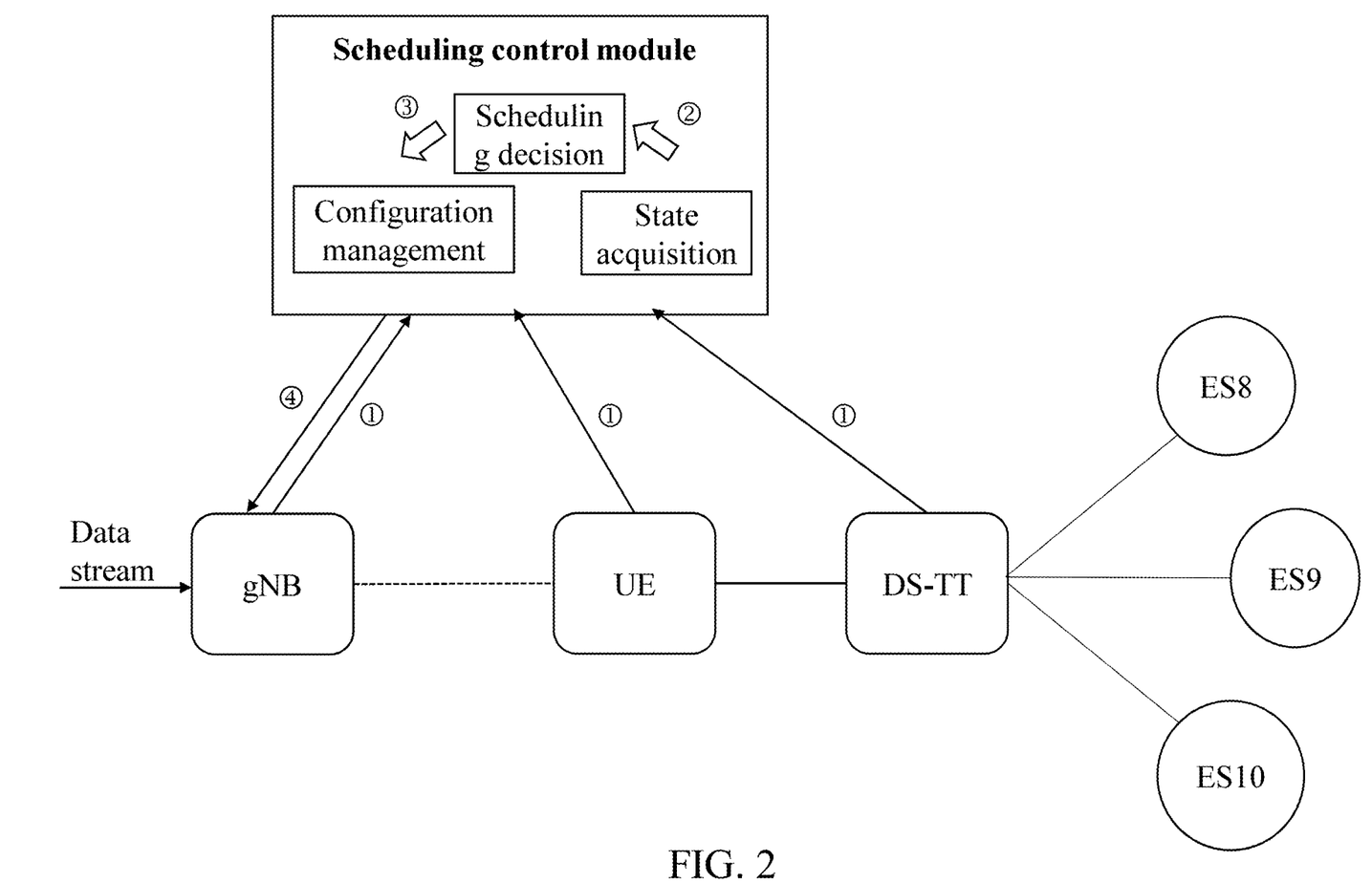
FIG. 2 is a schematic diagram of a DDPG-based downlink resource scheduling network module according to an embodiment of the present disclosure.

Based on the above, this embodiment designs a downlink resource scheduling control module (SCNM) based on DDPG. The SCNM includes a state information acquisition module, a scheduling decision making module, and a configuration management module. Connections of these modules are as illustrated in FIG. 2. Specifically, the SCNM is connected to a network device of the 5G-TSN; the state information acquisition module and the configuration management module are respectively connected to the scheduling decision making module; and the scheduling decision making module is configured to make a decision according to acquired state information, and send a decision making result to the configuration management module, and uniformly configure a base station. The specific functions of the modules are described as follows.

The state information acquisition module is configured to acquire bottom-layer network information, including: channel information, gate control list information of a TSN domain, and queue information in a base station.

Figure 3:
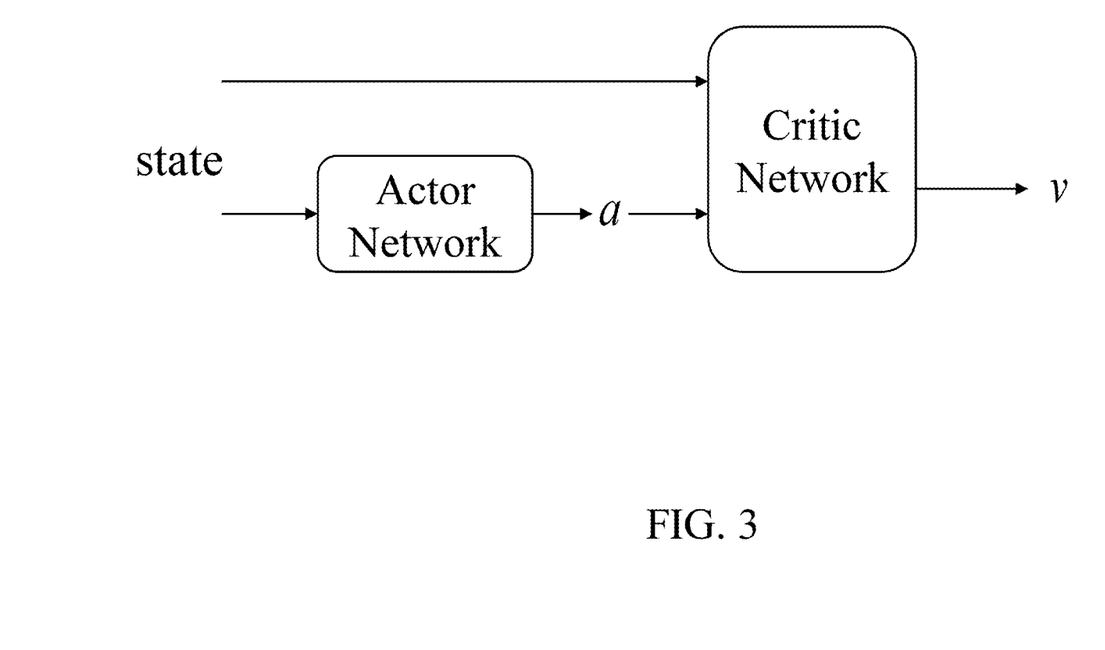
FIG. 3 is a schematic diagram of a DDPG algorithm according to an embodiment of the present disclosure.

The scheduling decision making module is configured to make a decision using a DDPG algorithm, wherein the algorithm module is composed of a Critic network and an Actor network, the input is a state, and the output is an action, i.e., a decision, as illustrated in FIG. 3. The scheduling decision making module is involved in offline training and online execution. The Critic network and the Actor network both participate in the training, and only the Actor network participates in the online execution.

The configuration management module is configured to convert, based on a global optimization result obtained by the scheduling decision making module, the decision making result to a message command understandable by the base station, and uniformly configure the base station.

Further, the specific flow of the SCNM implementation decision according to this embodiment is as follows.

Figure 4:
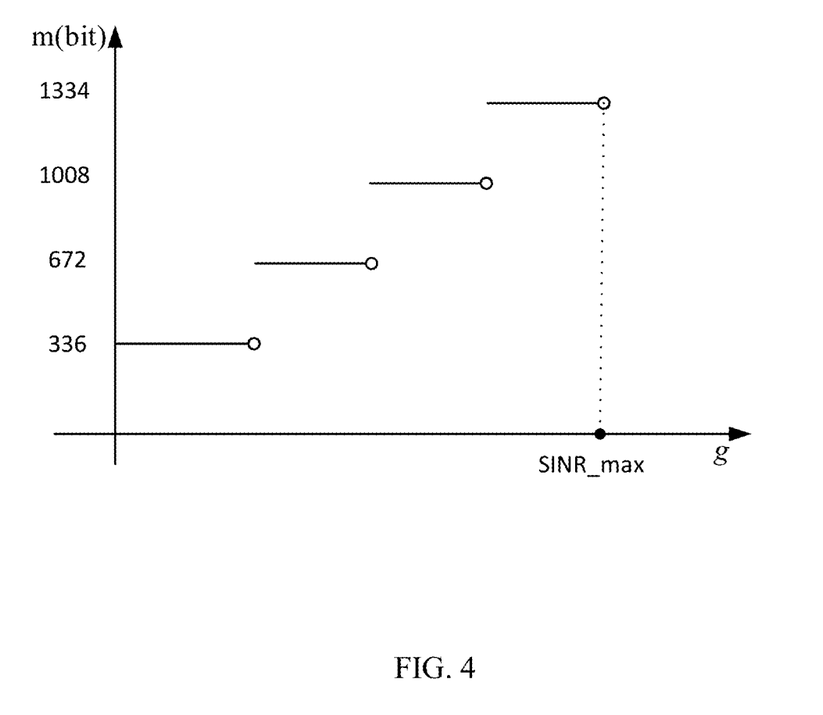
FIG. 4 is a schematic diagram illustrating a relationship between a channel quality and a resource bearing capacity according to an embodiment of the present disclosure.

In S1, a DS-TT of the TSN, a 5G base station, and a UE uploads state information to the SCNM, including: a gate control state $I_{GCL}^{TS} \in \{0, 1\}$ of DS-TT, a length l of each queue in the base station, a waiting delay d of a queue head, and a channel quality g of a 5G system;

In S2, the state information acquisition module processes the above information and sends the processed information to the scheduling decision making module. The process includes:

S21, mapping, based on the channel quality, a number of bits that one resource block is capable of bearing;

$$m_i = Z(g_i)$$

wherein $g_i$ represents a channel quality of receiving a current queue i, $m_i$ represents the number of bits that one resource block is capable of bearing, and Z represents a mapping function, as illustrated in FIG. 4;

S22: calculating, based on the channel information and the queue information, a number of resources desired by each queue;

$$r_i^{expt} = \frac{s_i \times l_i}{m_i}$$

wherein $s_i$ represents a data packet size of a queue i, $l_i$ represents a length of the queue i, and $r_i^{expt}$ represents a number of resources desired by the queue i; and S23, setting a stop time for each service, and normalizing the waiting delay based on the stop time;

$$d_i^{nor} = \frac{d_i^h}{d_i}$$

wherein $d_i^{nor}$ represents a normalized waiting delay, $d_i^h$ represents the stop time of the service, and $d_i$ represents a waiting time of a service in the queue in the base station; and S24, obtaining the processed state information $S=(r^{expt}, l, d, I_{GCL}^{TS})$.

In S3, the scheduling decision making module makes a decision based on the information processed by the state information acquisition module. The decision making process is divided into an off-line training process and an on-line execution process, which are specifically described as follows:

1. The Off-Line Training Flow of the Scheduling Decision Making Module:

1) Data Set Generation Process:

a) The scheduling decision making module receives the transmitted state information $S_t$ at time t, and outputs a decision according to an initialized network parameter $A_t$, wherein the decision $A_t$ output by the network has only two values of 0 and 1, namely $\{0,1\}_{\{N \times 1\}}$, wherein N represents the number of queues to be scheduled in the base station. 0 indicates that no resources are allocated to the queue, and 1 indicates that resources are allocated to the queue. The number $r_i^{act}$ of resources that are actually allocated to the queue i is obtained by the following equation:

$$r_i^{act} = \left\lceil \frac{a_i \cdot r_i^{expt}}{\sum_{i=1}^{N} a_i \cdot r_i^{expt}} * \Omega \right\rceil$$

Ω represents a total number of resources, and $a_i$ represents whether resources are allocated to the queue i.

b) Upon execution of the action $A_t$ and allocation of the $r_i^{act}$ resources, an initial reward function r is as follows:

$$r = \frac{1}{d_i - d_i^h + \Delta}$$

The function is an inverse of a deadline of each traffic minus a latency of the traffic in the base station queue plus a small positive number. The purpose of this function is to allow each service to be transmitted at a time as close as possible to the deadline. This not only satisfies the delay and meets the requirements of the deadline, but also saves a lot of transmission time for other services besides time-sensitive services. In addition, there will be a throughput constraint for non-time sensitive services, and when the throughput of non-time sensitive services does not satisfy the following equation, the result will be that the reward function is 0, and therefore the action output by the algorithm will ensure that the throughput satisfies the constraint as far as possible, and in this case there is a reward value greater than 0, rather than approaching the deadline. In this case the reward is most likely 0.

$$\bar{c}(t) > c_{min}$$

$$\bar{c}(t) = \frac{\sum_{k=1}^{t} c_i(k)}{t \cdot T_{TTI}},$$

and $T_{TTI}$ represents a scheduling timeslot interval of 5G.

Therefore, the reward function $r_v$ of the video stream is correspondingly changed to:

$$r_v = \begin{cases} \frac{1}{d_i - d_i^h + \Delta} & c \geq c^{min}, \\ 0 & c < c^{min} \end{cases}$$

Figure 5:
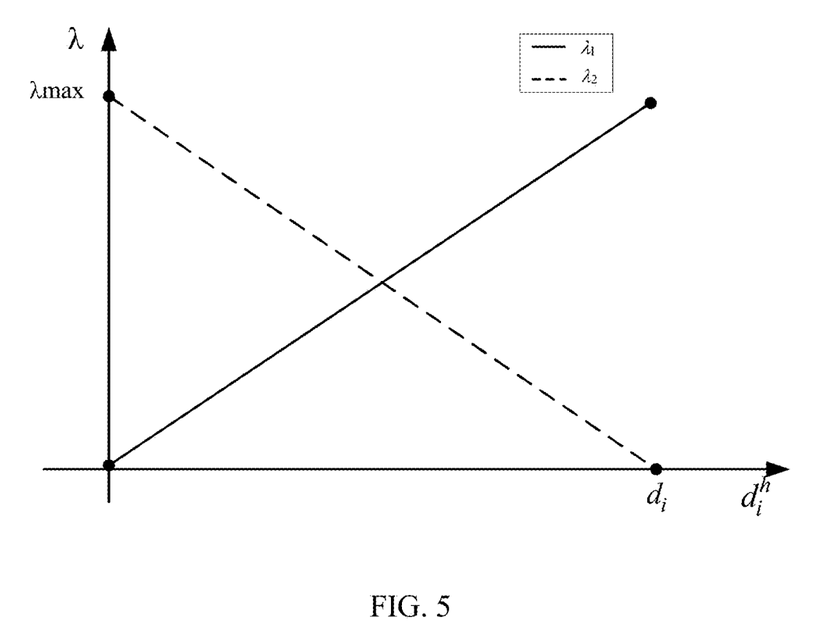
FIG. 5 is a schematic diagram illustrating a relationship between 2 and a wait time according to an embodiment of the present disclosure.

Further, for time-sensitive streams, the gate control state of the DS-TT needs to be taken into account, and therefore, a potential function $\psi$ is constructed to reflect the importance of different delays and gate control states. The parameter $\lambda$ in the potential function is as illustrated in FIG. 5. The reward value for the time-sensitive service is firstly related to the gate control of the DS-TT, and when the gate control is on, the reward value obtained by the time-sensitive service is scheduled at this moment. In addition, when the time is farther from the cut-off time, the reward value is smaller, and conversely, the bigger. Therefore, a reward function $r_t$ is constructed as follows:

$$r_t = \psi(r_v) = \begin{cases} (1+\lambda_1)*r, & I_{GCL}^{TS} = 1 \\ (1-\lambda_2)*r, & I_{GCL}^{TS} = 0 \end{cases}$$

$d_i^h$ represents the stop time of the service, $d_i$ represents the waiting time of the service in the queue in the base station, $\Delta$ represents a predetermined positive number, c represents an average throughput of a current video stream, $c^{min}$ represents a minimum average throughput desired by a video streaming service, $\lambda_1$ and $\lambda_2$ represent two parameters respectively for adjusting and controlling service reward values for different waiting times when the gate control is enabled or disabled, and $\psi$ represents a potential function.

In summary:

$$r = \begin{cases} r_t \\ r_v \end{cases}$$

c) When an action is performed, the environment goes to a next state $S_{t+1}$, and therefore, a group of training sets is obtained; and the process is repeated, and a plurality of groups of data sets are obtained.

2) Training Process of Scheduling Decision Making Module Based on the DDPG Algorithm:

The DDPG architecture is illustrated in FIG. 3, including a Critic network and an Actor network. The Actor network is to output actions according to the state of environment, and the Critic network is to score the actions output by actor. During training of DDPG, both the Critic network and the Actor network are trained. The purpose of training the Actor network is to make the actions output by Actor network more "cater" to the Critic network, and thus the Critic network would give a high score. The purpose of training the Critic network is to make the Critic network score the actions closer to the actual value. The training process is as follows:

a) A group of state transition sets $(S_t, A_t, r_t, S_{t+1})$ is input.
b) The Critic network scores a performed action $A_t$ according to a state $S_t$ at an instant t, and the score is marked as $q_t$.
c) the Actor network outputs an action $A_{t+1}$ according to a state $S_{t+1}$ at a t+1 instant, and then the Critic network scores $A_{t+1}$ and the score is marked as $q_{t+1}$.
d) According to the Bellman formula, the error is calculated:

$$\delta_t = q_t - (r_t + \gamma * q_{t+1})$$

e) The Critic network is updated using a gradient descent method:

$$W = W - \alpha * \delta_t * \frac{\partial Q(S_t, A_t; W)}{\partial W}$$

f) The Actor network is updated using a gradient ascent method:

$$g = \frac{\partial Q(S_t, A_t; W)}{\partial \Theta} = \frac{\partial \pi(S_t; \Theta)}{\partial \Theta} * \frac{\partial Q(S_t, A_t; W)}{\partial A_t}$$

$$\theta = \theta + \beta * g$$

2. On-Line Prediction Flow of the Scheduling Decision Making Module:

The parameters of the DDPG model are saved upon convergence of the off-line DDPG model training. When the scheduling decision making module is executed online, the saved model is imported, and then the scheduling decision making module sends the decision making result to the configuration management module upon outputting an action using an Actor module.

In S4, the configuration management module converts the received decision into a message command understandable by a network switching device, and sends the message command to the base station.

Hereinafter, the effectiveness of the scheduling policy according to this embodiment is illustrated by means of simulation.

A data source model, a wireless channel model, and a gate control state are set.

Generation of data packets complies with 0-1 distribution, wherein a probability p is 0.5, and generated data packets comply with 1-3 uniform distribution.

Attenuation of the radio channel follows a Rayleigh distribution, and in addition, the probability of an increase or decrease of users and base stations follows 0-1 distribution with a probability of 0.5.

Figure 6:
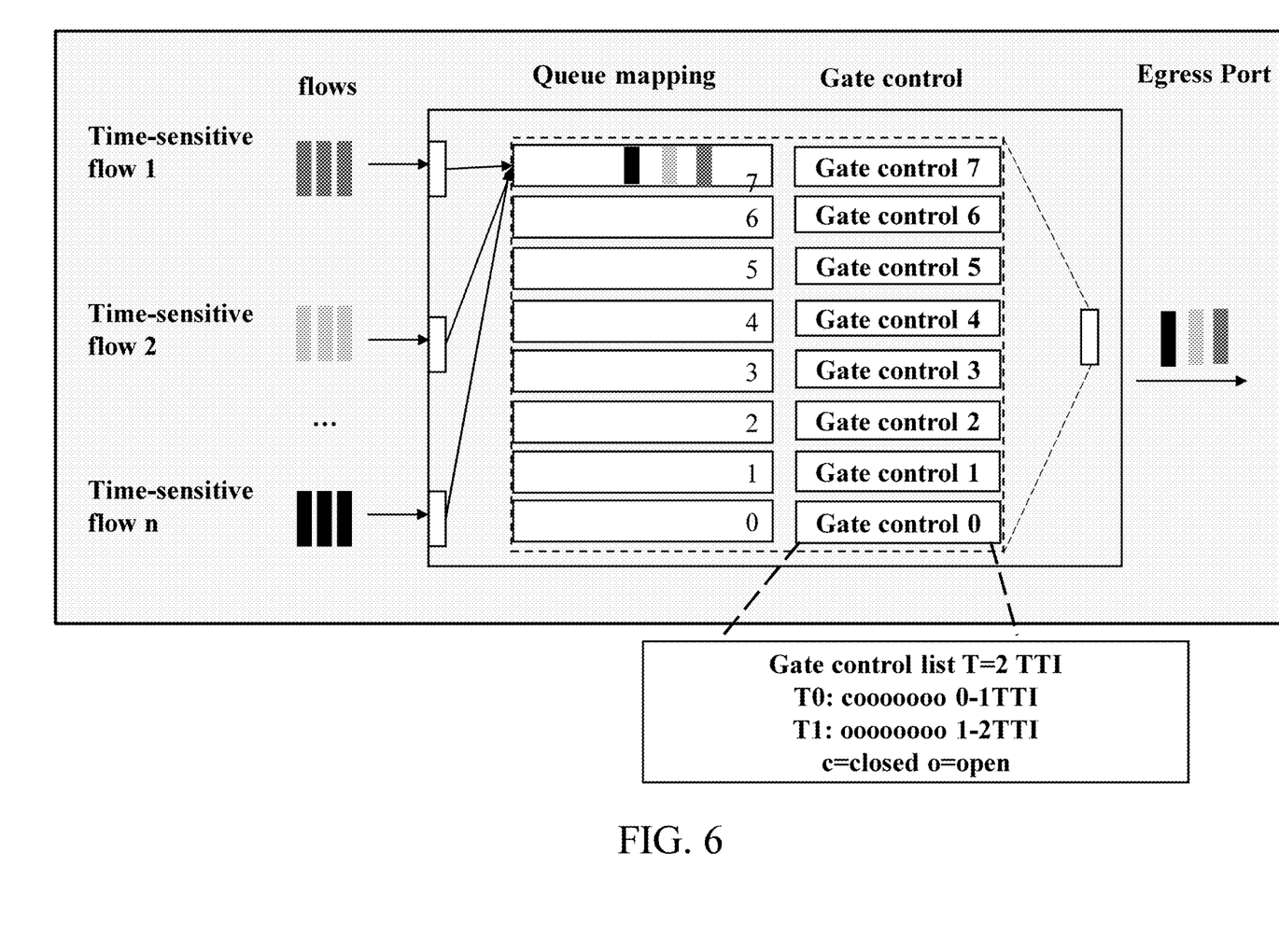
FIG. 6 is a schematic diagram of a DS-TT gate control state setting according to an embodiment of the present disclosure.

The gate control state is as illustrated in FIG. 6.

Based on this process, the simulation results are as follows.

Figure 7:
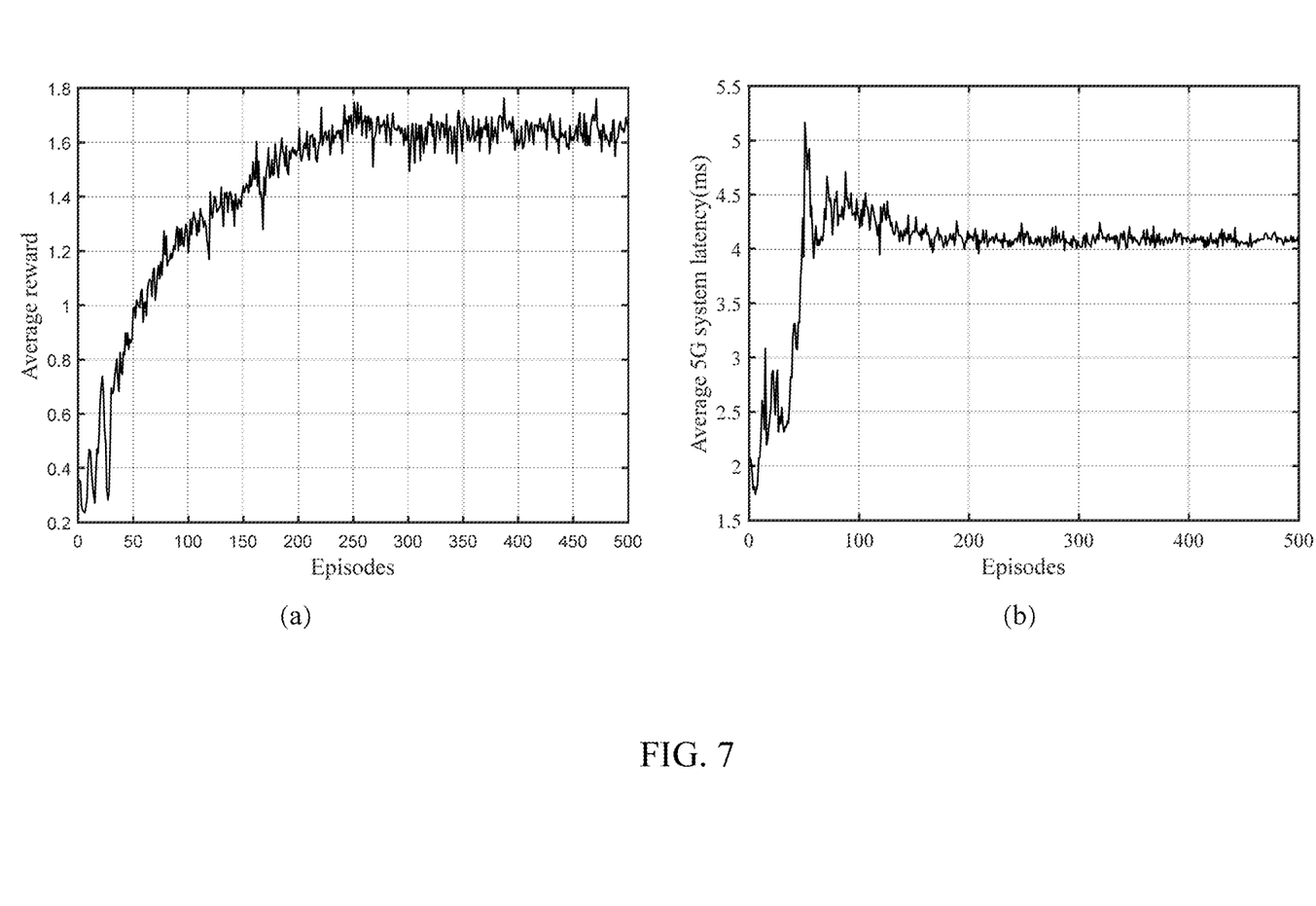
FIG. 7 is a schematic diagram of an algorithm training process according to an embodiment of the present disclosure; wherein (a) is a schematic diagram of changes, with the algorithm training, of an average reward value corresponding to the algorithm output action, and (b) is a schematic diagram of changes, with the algorithm training, of an end-to-end time delay of a time-sensitive service obtained by performing an action output by the algorithm.

FIG. 7(a) illustrates that, along with continuous training of the DDPG model, an average reward of all users per period gradually increases, and about 230 training segments later, fluctuation of reward decreases and finally converges between 1. 6 and 1. 8. FIG. 7(b) illustrates delay requirements of time-sensitive streams of resource scheduling decision making based on the DDPG model. According to the designed reward function, where a delay of the 5G system of the time-sensitive streams exceeds the EMLR, the associated reward is negative, such that the Agent is prevented from the actions directed to these negative rewards. Further, where the delay of the 5G system is closer to but does not exceed the EMLR of the time-sensitive streams, more rewards can be obtained. This is why the delay of the 5G system of the time-sensitive streams is low at the beginning of the training, constantly increases before approaching 80 sets, and converges gradually to 4 ms.

Figure 8:
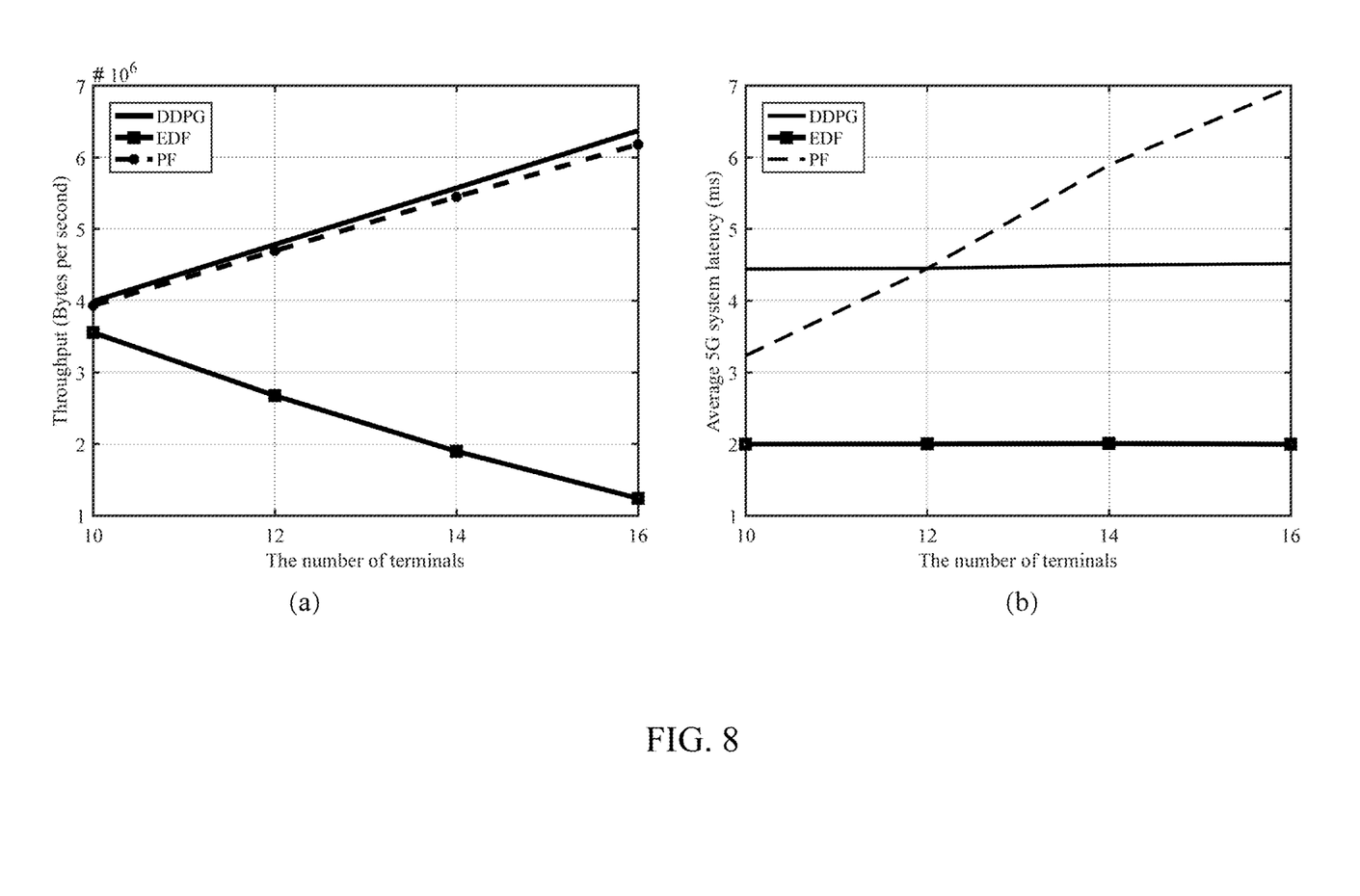

As can be seen from FIG. 8(a), EDF has the best performance on the time-sensitive streams. Since the EMLR of video streams is much larger than the EMLR of the time-sensitive streams of the TSN, the delay of the time-sensitive streams is closer to the deadline, and thus the scheduling priority of the time-sensitive stream is the highest. However, the PF algorithm is more concerned with the achieved data rate rather than the assurance of the delay. Therefore, the delay of the 5G system with PF increases as the number of terminals increases, and even exceeds the EMLR by 6 ms when the number of terminals reaches 16. The resource scheduling algorithm based on DDPG has better delay assurance performance than PF. With the increase of the number of terminals, the delay of the 5G system using DDPG is about 4 ms, which is larger than EDF, but can still satisfy the EMLR of time-sensitive streams.

Unlike the time-sensitive streams, the video streams are more concerned with the throughput. The system throughput performance in the multi-traffic coexistence scenario is illustrated in FIG. 8(b). EDF tends to schedule the time-sensitive streams, which means that fewer resources are available for the video streams. Thus, the throughput using EDF decreases as the number of terminals increases. However, the throughput increases as the number of terminals increases, both for DDPG and PF scheduling algorithms. Because the reward function is designed, the scheduling algorithm based on DDPG provides more scheduling opportunities for the video streams, and the delay requirements of the time-sensitive streams are not strict. Therefore, the scheduling algorithm based on DDPG has the best performance, and the throughput is improved by nearly 0.05% compared with PF.

It can be seen from the above that the downlink resource scheduling control policy based on DDPG proposed in this embodiment satisfies the delay requirements of strong real-time services, and meanwhile improves the system throughput.

In summary, this embodiment, with respect to the problem of multiple-service scheduling at air interfaces of the base stations, proposes a service scheduling module (an SCNM module) based on reinforcement learning. Accordingly, linkages between the gate control state of the DS-TT and base station scheduling are implemented, and an air interface scheduling policy for multiple services based on reinforcement learning is provided, such that delay requirements of time-sensitive services are satisfied, and throughputs of other services are improved to some extent.

Second Embodiment

This embodiment provides an electronic device. The electronic device includes a processor and a memory. The memory stores at least one instruction. The processor, when loading and executing the at least one instruction, is caused to perform the policy as described in the first embodiment.

The server may greatly vary due to different configurations or performance, and may include one or more central processing units (CPUs) and one or more memories. The memory stores at least one instruction, wherein the at least one instruction, when loaded and executed by the processor, may cause the processor to perform the policy as described in the first embodiment.

Third Embodiment

This embodiment provides a computer-readable storage medium. The computer-readable storage medium stores at least one instruction. The at least one instruction, when loaded and executed by a processor, causes the processor to perform the policy as described in the first embodiment. The computer-readable storage medium may be a read-only memory (ROM), a random-access memory (RAM), a compact disc ROM (CD-ROM), a magnetic tape, a floppy disk, an optical data storage device, or the like. The at least one instruction stored therein, when loaded and executed by a processor of a terminal, causes the terminal to perform the policy as described in the first embodiment.

In addition, it should be noted that the technical solutions according to the present disclosure may be provided as methods, apparatuses, or computer program products. Therefore, hardware embodiments, software embodiments, or hardware-plus-software embodiments may be used to illustrate the embodiments of the present disclosure. In addition, the present disclosure may further employ a computer program product which may be implemented by at least one non-transitory computer-readable storage medium with an executable program code stored thereon.

The present disclosure is described based on the flowcharts and/or block diagrams of the method, terminal device (system), and computer program product. It should be understood that at least one of each process and/or block in the at least one of the flowcharts and/or block diagrams, and any combination of the at least one of the processes and/or blocks in the at least one of the flowcharts and/or block diagrams may be implemented using computer program instructions. These computer program instructions may be issued to a general computer, an embedded processor, or processors of other programmable data processing terminal device to generate a machine, which enables the computer or the processors of other programmable data processing terminal devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing terminal devices to work in a specific mode, such that the instructions stored on the non-transitory computer-readable memory implement a product including an instruction apparatus, wherein the instruction apparatus implements specific functions in at least one process in the flowcharts and/or at least one block in the block diagrams. These computer program instructions may also be stored on a computer or other programmable data processing terminal devices, such that the computer or the other programmable data processing terminal devices execute a series of operations or steps to implement processing of the computer. In this way, the instructions, when executed on the computer or the other programmable data processing terminal devices, implement the specific functions in at least one process in the flowcharts and/or at least one block in the block diagrams.

It should be noted that, in this specification, terms "comprise," "include," "have," "contain," or any other variations thereof are intended to cover a non-exclusive inclusion, such that a process, method, article, or apparatus, that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus.

Described above are preferred embodiments of the present disclosure. It should be noted that persons of ordinary skill in the art may derive other improvements or polishments without departing from the principles of the present disclosure. Such improvements and polishments shall be deemed as falling within the protection scope of the present disclosure. Therefore, the preferred embodiments and all such modifications and variations shall fall within the protection scope subject to the appended claims.

What is claimed is:

1. A 5G time-sensitive networking (5G-TSN) resource joint scheduling apparatus based on deep deterministic policy gradient (DDPG), applicable to a 5G-TSN network device, the apparatus comprising: a state information acquisition module, a scheduling decision making module, and a configuration module, the state information acquisition module and the configuration module being both connected to the scheduling decision making module; wherein
the state information acquisition module is configured to acquire bottom-layer network information, process the acquired bottom-layer network information to obtain state information, and transmit the obtained state information to the scheduling decision making module, wherein the bottom-layer network information comprises channel information, gate control list information of a TSN domain, and queue information in a base station;
the scheduling decision making module is configured to obtain a result of decision making based on a state information output by the state information acquisition module using a DDPG-based reinforcement learning model, and transmit the result of decision making to the configuration module, wherein the result of decision making comprises whether to allocate resources for a current queue and a number of resources actually allocated to the current queue;
the configuration module is configured to convert the result of decision making to one or more instructions understandable by the base station to configure the base station; and
wherein the state information acquisition module is configured to:
acquire the bottom-layer network information, comprising: a gate control state $I_{GCI}^{TS} \subset \{0,1\}$ of device side TSN translator (DS-TT), a length l of each queue in the base station, a waiting delay d of a queue head, and a channel quality g of a 5G system;
process the acquired bottom-layer network information to obtain the state information, comprising:
mapping, based on the channel quality, a number of bits that one resource block is capable of bearing;

$$m_i = Z(g_i)$$

wherein $g_i$ represents a channel quality of receiving a current queue i, $m_i$ represents the number of bits that one resource block is capable of bearing, and Z represents a mapping function;
calculating, based on the channel information and the queue information, a number of resources desired by each queue;

$$r_i^{expt} = s_i \times l_i / m_i$$

wherein $s_i$ represents a data packet size of a queue i, $l_i$ represents a length of the queue i, and $r_i^{expt}$ represents a number of resources desired by the queue i; and
setting a stop time for each service, and normalizing the waiting delay based on the stop time;

$$d_i^{nor} = d_i^h / d_i$$

wherein $d_i^{nor}$ represents a normalized waiting delay, $d_i^h$ represents the stop time of the service, and $d_i$ represents a waiting time of a service in the queue in the base station; and
transmit the obtained state information to the scheduling decision making module, wherein the state information comprises the number of resources desired by each queue, the length of each queue, the normalized waiting delay, and the gate control state.

2. The 5G-TSN resource joint scheduling apparatus according to claim 1, wherein the number of resources that are actually allocated to the queue i is obtained by the following equation:

$$r_i^{act} = \left\lceil \frac{a_i \cdot r_i^{expt}}{\sum_{i=1}^{N} a_i \cdot r_i^{expt}} * \Omega \right\rceil$$

wherein $r_i^{act}$ represents the number of resources that are actually allocated to the queue i, $\Omega$ represents a total number of resources, $a_i$ represents whether resources are allocated to the queue i, and N represents a number of queues to be scheduled in the base station.

3. The 5G-TSN resource joint scheduling apparatus according to claim 1, wherein when data is a video stream, the reinforcement learning model uses a reward function $r_v$ as follows:

$$r_v = \begin{cases} \dfrac{1}{d_i - d_i^h + \Delta} & c \geq c^{min}, \\ 0 & c < c^{min} \end{cases}$$

for a time-sensitive stream, the reinforcement learning model uses a reward function r, as follows:

$$r_t = \psi(r_v) = \begin{cases} (1+\lambda_1)*r, & I_{GCL}^{TS} = 1 \\ (1-\lambda_2)*r, & I_{GCL}^{TS} = 0 \end{cases}$$

$$r = \dfrac{1}{d_i - d_i^h + \Delta}$$

wherein $d_i^h$ represents the stop time of the service, $d_i$ represents the waiting time of the service in the queue in the base station, $\Delta$ represents a predetermined positive number, c represents an average throughput of a current video stream, $c^{min}$ represents a minimum average throughput desired by a video streaming service, $\lambda_1$ and $\lambda_2$ represent two parameters respectively for adjusting and controlling service reward values for different waiting times when the gate control is enabled or disabled, and $\psi$ represents a potential function.

4. A 5G time-sensitive networking (5G-TSN) resource joint scheduling method based on deep deterministic policy gradient (DDPG), applicable to a 5G-TSN network device, the method comprising:
acquiring bottom-layer network information, and processing the acquired bottom-layer network information to obtain state information, wherein the bottom-layer network information comprises channel information, gate control list information of a time-sensitive networking (TSN) domain, and queue information in a base station;
obtaining a result of decision making based on the state information using a DDPG-based reinforcement learning model, wherein the result of decision making comprises whether to allocate resources for a current queue and a number of resources actually allocated to the current queue;
converting the result of decision making to one or more instructions understandable by the base station to configure the base station; and
wherein acquiring the bottom-layer network information, and processing the acquired bottom-layer network information to obtain the state information comprise:
acquiring the bottom-layer network information, comprising: a gate control state $I_{GCI}^{TS} \in \{0,1\}$ of device side TSN translator (DS-TT), a length l of each queue in the base station, a waiting delay d of a queue head, and a channel quality g of a 5G system;
processing the acquired bottom-layer network information to obtain the state information, comprising:
mapping, based on the channel quality, a number of bits that one resource block is capable of bearing;

$$m_i = Z(g_i)$$

wherein $g_i$ represents a channel quality of receiving a current queue i, $m_i$ represents the number of bits that one resource block is capable of bearing, and Z represents a mapping function;
calculating, based on the channel information and the queue information, a number of resources desired by each queue;

$$r_i^{expt} = s_i \times l_i / m_i$$

wherein $s_i$ represents a data packet size of a queue i, $l_i$ represents a length of the queue i, and $r_i^{expt}$ represents a number of resources desired by the queue i;
setting a stop time for each service, and normalizing the waiting delay based on the stop time;

$$d_i^{nor} = d_i^h / d_i$$

wherein $d_i^{nor}$ represents a normalized waiting delay, $d_i^h$ represents the stop time of the service, and $d_i$ represents a waiting time of a service in the queue in the base station; and
finally obtaining the state information to the scheduling decision making module, wherein the state information comprises the number of resources desired by each queue, the length of each queue, the normalized waiting delay, and the gate control state.

5. The 5G-TSN resource joint scheduling method according to claim 4, wherein the number of resources that are actually allocated to the queue i is obtained by the following equation:

$$r_i^{act} = \left\lceil \dfrac{a_i \cdot r_i^{expt}}{\sum_{i=1}^{N} a_i \cdot r_i^{expt}} * \Omega \right\rceil$$

wherein $r_i^{act}$ represents the number of resources that are actually allocated to the queue i, $\Omega$ represents a total number of resources, $a_i$ represents whether resources are allocated to the queue i, and N represents a number of queues to be scheduled in the base station.

6. The 5G-TSN resource joint scheduling method according to claim 4, wherein when data is a video stream, the reinforcement learning model uses a reward function $r_v$ as follows:

$$r_v = \begin{cases} \dfrac{1}{d_i - d_i^h + \Delta} & c \geq c^{min}, \\ 0 & c < c^{min} \end{cases}$$

for a time-sensitive stream, the reinforcement learning model uses a reward function $r_t$ as follows:

$$r_t = \psi(r_v) = \begin{cases} (1+\lambda_1)*r, & I_{GCL}^{TS} = 1 \\ (1-\lambda_2)*r, & I_{GCL}^{TS} = 0 \end{cases}$$

$$r = \dfrac{1}{d_i - d_i^h + \Delta}$$

wherein $d_i^h$ represents the stop time of the service, $d_i$ represents the waiting time of the service in the queue in the base station, $\Delta$ represents a predetermined positive number, c represents an average throughput of a current video stream, $c^{min}$ represents a minimum average throughput desired by a video streaming service, $\lambda_1$ and $\lambda_2$ represent two parameters respectively for adjusting and controlling service reward values for different waiting times when the gate control is enabled or disabled, and $\psi$ represents a potential function.

\* \* \* \* \*